Aug. 16, 1938.                F. J. HERBELIN                2,127,118
                          COTTON BALE COVER HOLDER
                         Filed March 21, 1935        2 Sheets-Sheet 1

Inventor
F. J. HERBELIN
Jesse R. Stone
Lester B. Clark
By Attorneys

Aug. 16, 1938.                  F. J. HERBELIN                    2,127,118
                             COTTON BALE COVER HOLDER
                              Filed March 21, 1935           2 Sheets-Sheet 2

Inventor
F. J. HERBELIN.
Jesse R. Stone
Lester B. Clark
By
Attorneys

Patented Aug. 16, 1938

2,127,118

UNITED STATES PATENT OFFICE 2,127,118

COTTON BALE COVER HOLDER

Francis J. Herbelin, Galveston, Tex.

Application March 21, 1935, Serial No. 12,234

3 Claims. (Cl. 100—14)

The invention relates to an improvement in cotton bale cover holders.

In connection with certain materials which are pressed into bales for transportation it is the usual practice to provide a covering over certain portions of the material such as the top, bottom, and ends of the bale. This covering is provided in order to protect the material from dirt and dust and to also hold the material in place. In many instances such as in connection with cotton bales a plurality of ties extend transversely around the bale and where the covering extends over the ends the covering from the top and the covering from the bottom are merely laced together with a string or cord. In the handling of the bale, and particularly with cotton bales where hooks are used, this covering is torn and the lacing broken to such extent that the covering is loosened and in many cases entirely torn away. The end of the bale then becomes dirty and general damage occurs.

It is one of the objects of the present invention to provide an improved form of bale covering holder wherein an additional strap is provided about the end of the bale to hold the covering in position.

Another object of the invention is to provide a strap portion for an end bale tie which will underlie the transverse ties positioned about the bale.

Another object of the invention is to insert a strap portion on the top and bottom of a bale when transverse ties are being positioned and handled so that the straps will be held by the transverse ties and can be buckled together to confine the ends of the bale.

Another object of the invention is to provide a plurality of ties over the end of a bale.

Other and further objects of the invention will be readily apparent when the following description is considered in connection with the accompanying drawings wherein.

Figure 1:
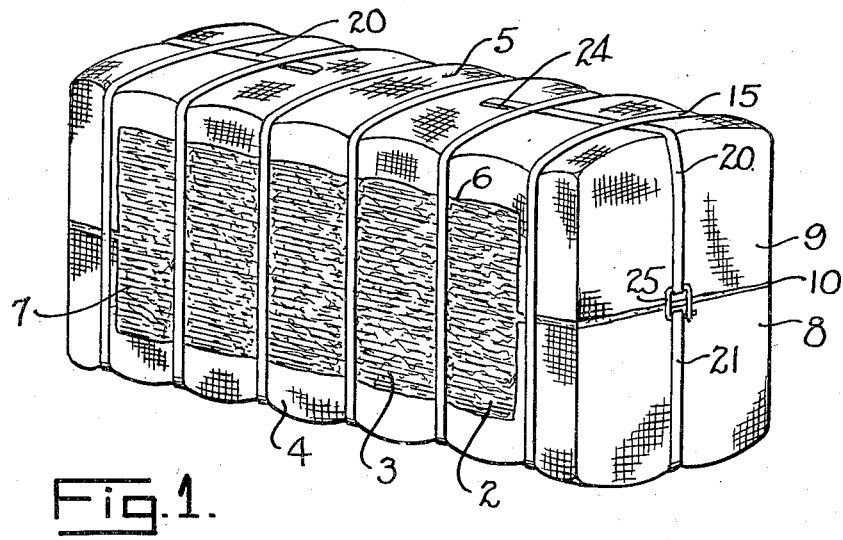
Fig. 1 is a perspective view of a bale to which end ties have been applied.

In Fig. 1 the bale is indicated generally at 2 and may be of any material which is to be confined in a bale for transportation. A cotton bale has been shown in these drawings and the usual practice is to position the cotton in the bale in layers 3. When the bale is being formed the bottom covering 4 is positioned and then layers 3 of material are disposed thereon. The upper covering 5 is then disposed and arranged with the edges 6 slightly overlapping the sides 7 of the bale. The end 8 of the bottom covering 4 and the end 9 of the top covering 5 are carried over the ends of the bale and terminate closely adjacent each other as at 10. The transverse bale ties 15 are passed around the bale and are attached together in the usual manner by any suitable type of buckle.

Figure 4:
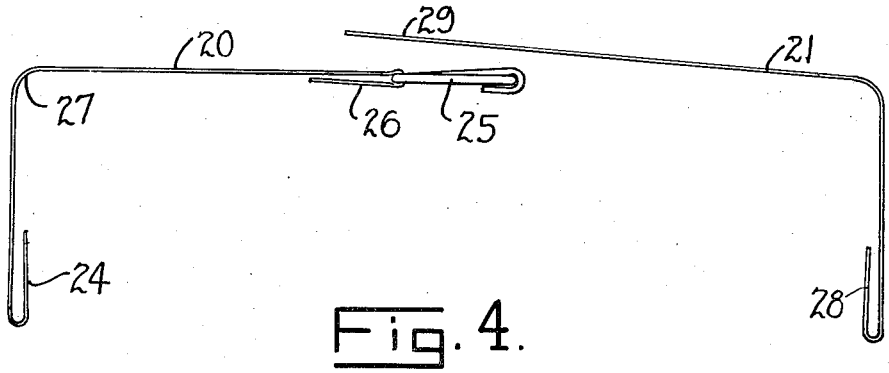
Fig. 4 shows the two end straps which are to be positioned on the top and bottom of the bale.

The ends 8 and 9 in the usual practice, are laced together with a string or cord, but as previously pointed out this practice is objectionable because the lacing is easily broken by the hooks used in handling the bales and the present invention seeks to confine the ends 8 and 9 so that they cannot be pulled loose. To accomplish this the straps or ties 20 and 21 are provided. These straps are best seen in Fig. 4 and may be of the same width and thickness of material as the ties 15. The strap 20 may have its end 24 recurved so that it will lie underneath the body of the strap. In this manner when the pressure is taken by the ties 15 this portion 24 will be forced inwardly against the covering 5 so that the strap will not slip from position. The buckle 25 may be attached to one end of the strap 20 by having the end 26 thereof passed through the buckle and bent beneath the body of the strap 20. The curve 27 may or may not be made in the strap prior to its use. The strap 21 has a recurved end 28 similar to the end 24, and the end 29 thereof will preferably remain stationary until the end straps are positioned.

Figure 5:
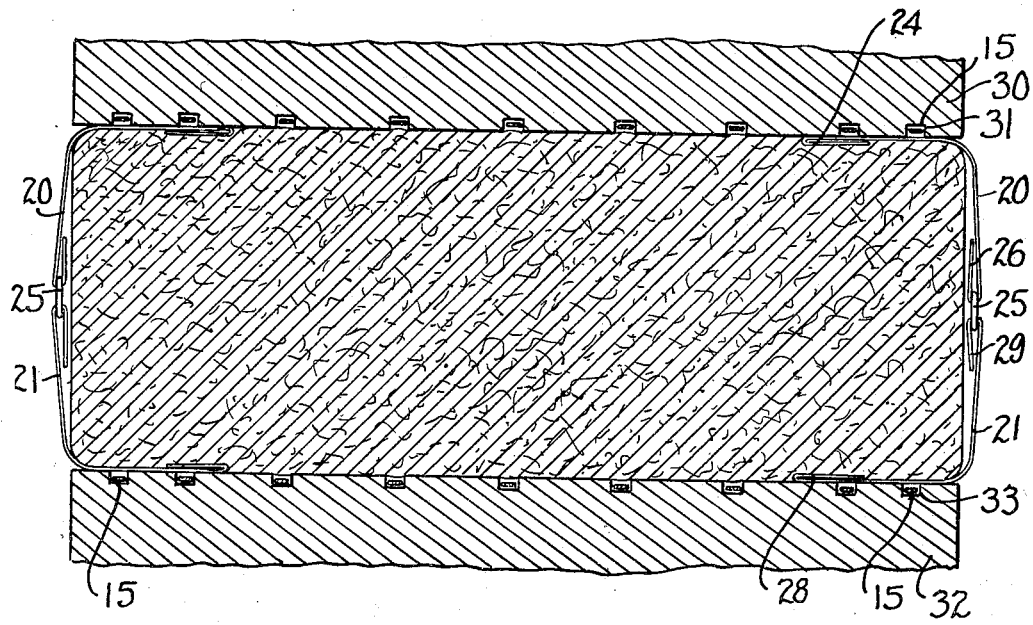
Fig. 5 shows a sectional view of the bale being compressed and the manner of positioning the end straps.

The sectional view of Fig. 5 shows the manner of positioning the end straps that will be applied when the bale is located in the press. The upper ram 30 of the press usually remains stationary and has a plurality of grooves 31 therein to receive the straps 15. The lower ram 32 is usually movable and the bale is rolled into position on this ram 32 with the straps 15 located in the grooves 33. The strap 21 will be positioned on the ram 32 prior to rolling the bale into position and after it is in position the strap 20 will be placed over the end of the bale. The portions 24 and 28 will be against the bale coverings 5 and 4, respectively, and the transverse ties 15 will be positioned around the bale so that the straps 20 and 21 will underlie the ties 15.

When pressure is applied to the bale to compress it to its maximum position, then the end 29 will be passed through the buckle 25 and bent under as seen in Fig. 5. The same procedure is carried out for both ends of the bale.

When the lower ram 32 moves downwardly to release the pressure on the bale, then, of course, the transverse ties 15 prevent expansion of the bale. There is some expansion, however, in order that the ties will take the load and this amount of expansion tends to draw the transverse ties 15 tight about the bale. This same expansion will draw the ties 20 and 21 tight about the ends of the bale and force the portions 24, 26, 28 and 29 against the respective portions of the strap so that there will be no creeping or slipping of the inturned portions.

It has been found that when straps or ties such as 20 and 21 are applied to the end of the bale that the center portion at least of the ends 8 and 9 are firmly confined in position and prevent the covering from being displaced. In this manner the ends of the bale are protected from dirt and a saving of several pounds of cotton is made upon each bale.

It will be appreciated that when the end coverings 8 and 9 are torn loose or removed and the bale is turned up on end on a dust covered floor, freight car, or other surface, that the end cotton comes directly in contact with the dirt and its value considerably lessened.

Figure 2:
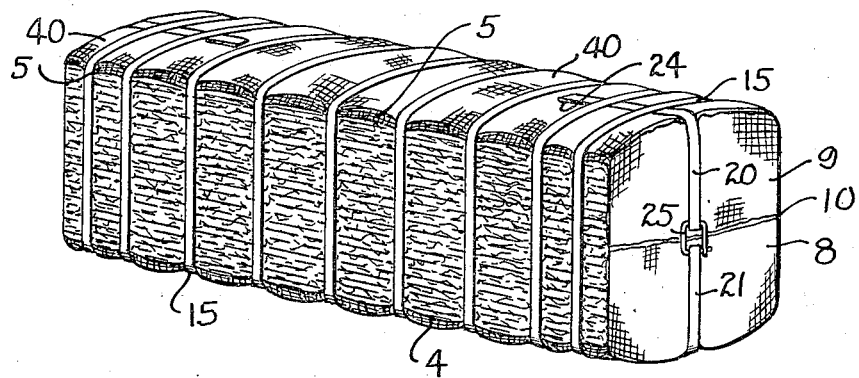
Fig. 2 shows a perspective view of a bale similar to Fig. 1 but wherein the material has been compressed to a higher density and a greater number of ties have been provided.

Fig. 2 shows a high density bale which is a bale similar to that of Fig. 1 which has been compressed to a greater density in order to cause a greater compression and lesser volume of the same amount of material. Bales are usually compressed to high density for purposes of foreign shipment, so that they will occupy less space in the vessel or in other means of shipment. With a bale of this type the same procedure is followed as in connection with the bale of Fig. 1 except that a greater number of ties 15 are provided and in addition to the coverings 4 and 5 an additional layer of covering material such as the patch 40 may be provided. This patch is in the form of a strip of material that merely overlies the coverings 4 and 5. This patch serves to reenforce the coverings so that the ties 15 will not cut through the covering and into the material. The end straps 20 and 21 will be applied in the same manner and will overlie both the covering and the patch if desired.

Figure 3:
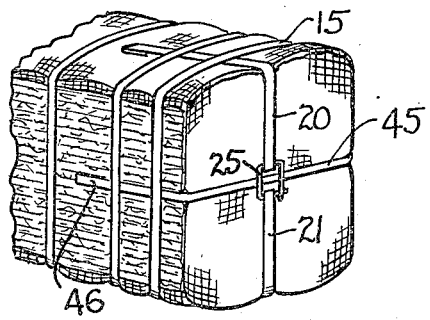
Fig. 3 shows an end view of a bale wherein crossed sets of end ties have been provided.

Fig. 3 shows a modified form of the invention which is similar to that of Fig. 2 except that an additional end strap 45 has been provided which will preferably directly overlie the seam 10 where the ends 8 and 9 approach each other. Of course, in the pressing of the bale there will be no compression on the sides of the bale and the strap 45 can merely be located in the position at the time the pressure is removed from the press so that the transverse ties 15 will tend to compress the ends 46 of this cross-tie 45. This cross-tie 45 will preferably underlie the end ties 20 and 21 as seen in Fig. 3.

What is claimed is:

1. A holder for bale coverings of the type where the covering extends over the top, bottom and ends of the bale and is confined by transverse ties around the bale, said holder including separate upper and lower straps, one end of each of said straps being held in place by being positioned beneath the transverse ties, and a buckle on the other end of one strap adapted to receive the end of the other strap.

2. A holder for the ends of bale coverings of the type where the covering is confined by traverse ties, including a top strap, a bottom strap, said straps each having one end underlying a transverse bale tie to hold them in position, and means to connect the opposite ends of said straps together.

3. A holder for the ends of bale coverings of the type where the covering is confined by transverse ties, including a top strap, a bottom strap, said straps each having one end underlying a transverse bale tie to hold them in position, and means to connect the opposite ends of said straps together while the bale is under compression so that expansion of the bale will draw the ties tight against the end of the bale.

FRANCIS J. HERBELIN.